United States Patent [19]

Harada et al.

[11] Patent Number: 4,470,790
[45] Date of Patent: Sep. 11, 1984

[54] ADJUSTABLE EXTRUSION DIE ASSEMBLY

[75] Inventors: Jumei Harada; Takashi Yokoi, both of Kodaira, Japan

[73] Assignee: Bridgestone Tire Company Limited, Tokyo, Japan

[21] Appl. No.: 460,838

[22] Filed: Jan. 25, 1983

[30] Foreign Application Priority Data

Feb. 10, 1982 [JP] Japan .............................. 57-17892[U]

[51] Int. Cl.$^3$ ........................... B29F 3/04; B29H 3/00; B29H 17/36
[52] U.S. Cl. ................................ 425/192 R; 156/127; 156/129; 264/177 R; 425/381; 425/465; 425/466
[58] Field of Search .................... 425/192 R, 465, 466, 425/190, 376 A, 376 B, 376 R, 381, 467; 264/171, 177 R; 156/114, 127, 128.6, 129

[56] References Cited

U.S. PATENT DOCUMENTS 3,093,860  6/1963  Eilersen ............................... 425/466
3,195,183  7/1965  Phillips ................................ 425/466

Primary Examiner—Jay H. Woo
Assistant Examiner—Tinker R. McBrayer

[57] ABSTRACT

An adjustable extrusion die assembly forming part of an extruder for an elastic material, comprises: a stationary die member having an end surface; a plurality of movable die members positioned in side-by-side relationship to one another and slidably contacted with one another, the movable die members respectively having end surfaces opposing to and spaced apart from the end surface of the stationary member, the end surfaces of the stationary and movable die members defining in combination an extrusion opening through which the elastic material is to be extruded, the movable die members being individually movable toward and away from the end surface of the stationary die member with respect to one another so as to vary the distances between the end surface of the stationary die member and the end surfaces of the movable die members; a guide member having formed therein a guide slit having the movable die members guided therein; and a plurality of link members each interconnecting two adjacent movable die members.

5 Claims, 10 Drawing Figures

ADJUSTABLE EXTRUSION DIE ASSEMBLY

FIELD OF THE INVENTION

The present invention relates to an extrusion die assembly to be used in an extruder for an elastic material such as a rubber or synthetic resin material and more particularly to an adjustable extrusion die assembly having a plurality of movable die members adjustably movable for varying the cross sectional configuration of the material extruded through the extrusion die assembly.

SUMMARY OF THE INVENTION

In accordance with the present invention, there is provided an adjustable extrusion die assembly forming part of an extruder for an elastic material, comprising: a stationary die member having an end surface; a plurality of movable die members positioned in side-by-side relationship to one another and slidably contacted with one another, the movable die members respectively having end surfaces opposing to and spaced apart from the end surface of the stationary member, the end surfaces of the stationary and movable die members defining in combination an extrusion opening through which the elastic material is to be extruded, the movable die members being individually movable toward and away from the end surface of the stationary die member with respect to one another so as to vary the distances between the end surface of the stationary die member and the end surfaces of the movable die members; a guide member having formed therein a guide slit having the movable die members guided therein; and a plurality of link members each interconnecting two adjacent movable die members.

DESCRIPTION OF THE PRIOR ART

The drawbacks of a prior-art adjustable extrusion die assembly and the features and advantages of an adjustable extrusion die assembly according to the present invention will be more clearly understood from the following description taken in conjunction with the accompanying drawings in which.

DESCRIPTION OF THE PRIOR ART

Figure 1:
FIG. 1 is an ideal cross sectional view of an intermediate product of an elastic material.
Figure 2:
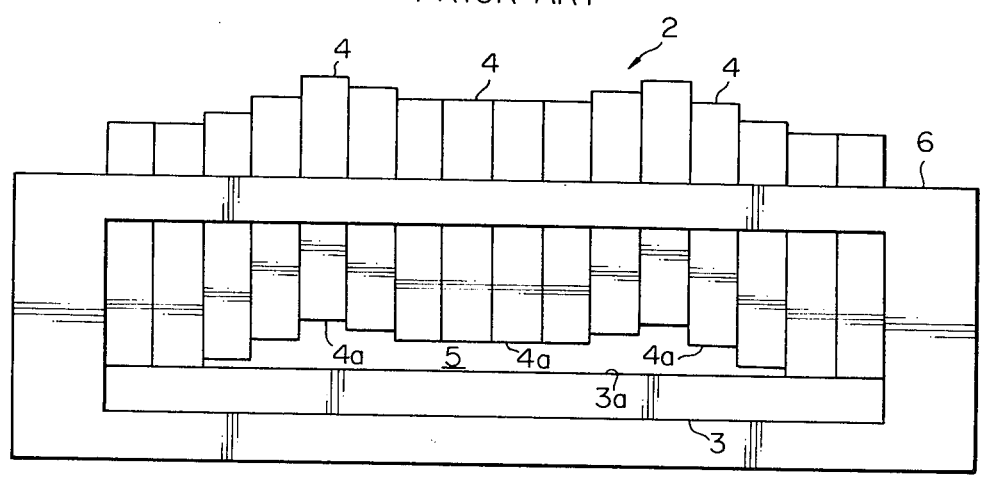
FIG. 2 is a fragmentary front view of a prior-art adjustable extrusion die assembly.

Conventionally, there have been proposed a wide variety of adjustable extrusion die assemblies of the type which is capable of extruding intermediate products of various kinds of cross sectional configurations to be produced into treads of pneumatic tires depending upon sizes and kinds of tires without changing an extrusion die assembly for another one. One of such extrusion die assemblies is disclosed in U.S. Pat. No. 3,195,183 which is proposed to extrude an intermediate product 1 for a tire tread having a cross sectional configuration shown in FIG. 1 by means of an adjustable extrusion die assembly 2 schematically shown in FIG. 2. The prior-art adjustable extrusion die assembly 2 is shown in FIG. 2 as comprising a stationary die member 3 having an upper end surface 3a and a plurality of movable die members 4 positioned in side-by-side relationship to one another and slidably contacted with one another. The movable die members 4 respectively have lower end surfaces 4a opposing to and spaced apart from the upper end surface 3a of the stationary member 3, the upper and lower end surfaces 3a and 4a of the stationary and movable die members 3 and 4, respectively, defining in combination an extrusion opening 5 through which the elastic material or intermediate product 1 is to be extruded. The movable die members 4 are caused to individually move downwardly toward and upwardly away from the upper end surface 3a of the stationary die member 3 with respect to one another by means of suitable drive means, not shown in the drawings, so as to vary the distances between the upper end surface 3a of the stationary die member 3 and the lower end surfaces 4a of the movable die members 4. The prior-art adjustable extrusion die assembly 2 further comprises a generally rectangular holder or guide member 6 having the movable die members 4 guided therein. It is to be noted that the upper configuration of the intermediate product 1 is regulated by the lower end surfaces 4a of the movable die members 4 whilst the lower configuration of the intermediate product 1 is determined by the upper end surface 3a of the stationary die member 3.

Figure 3:
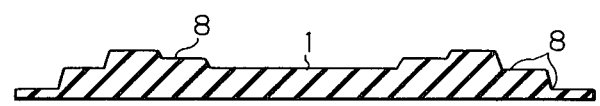
FIG. 3 is a cross sectional view of an intermediate product of an elastic material extruded by the prior-art adjustable extrusion die assembly.

The intermediate product 1 thus extruded by the adjustable extrusion die assembly 2 is of the cross sectional configuration as shown in FIG. 3. The upper contour of the cross sectional configuration of the intermediate product 1 has a plurality of corner portions 8 which are recessed approximately at right angles. The corner portions 8 of the intermediate product 1 tend to have stayed thereon a mold releasing agent which is coated on a green tire before the green tire is placed into a vulcanizing vessel in order to make it easy to release the green tire from the vulcanizing vessel. This results in problems encountered such as so called "flow crack" and "light spot bare" which deteriorates qualities of finished tires. In order to overcome such problems, it may be considered to employ as many movable die members as possible. However, such many movable die members give rise to complexity to the extrusion die assembly. In addition, the movable die members are liable to be buckled if the number of the movable die members is extremely increased, thereby having the widths thereof diminished.

The present invention contemplates provision of an improved adjustable extrusion die assembly which is free from the drawbacks pointed out in the above.

DESCRIPTION OF THE PREFERRED EMBODIMENTS

Figure 5:
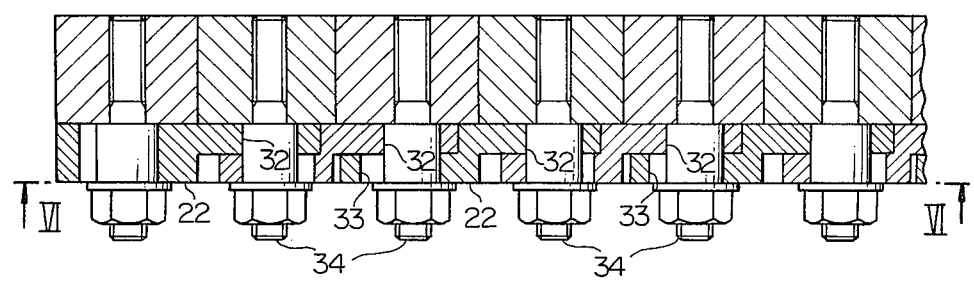
FIG. 5 is a fragmentary cross sectional view taken along the line V—V of FIG. 4.
Figure 4:
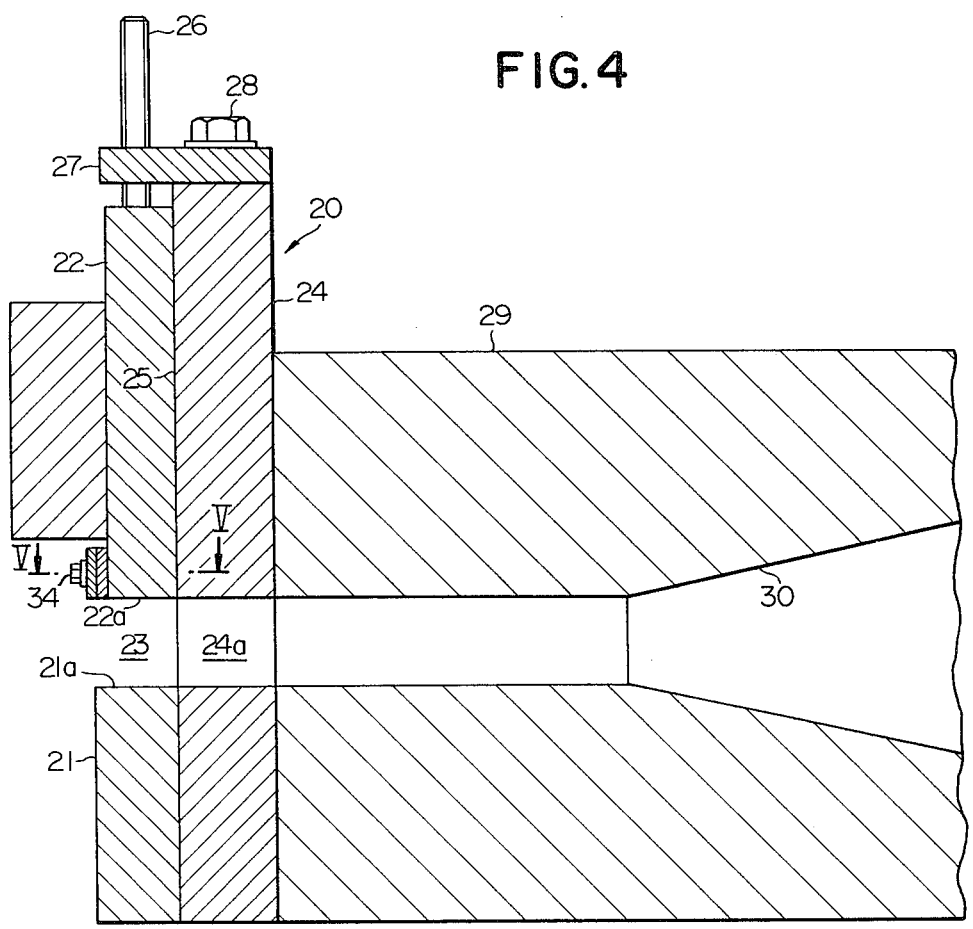
FIG. 4 is a cross sectional view showing a first preferred embodiment of an adjustable extrusion die assembly according to the present invention.
Figure 6:
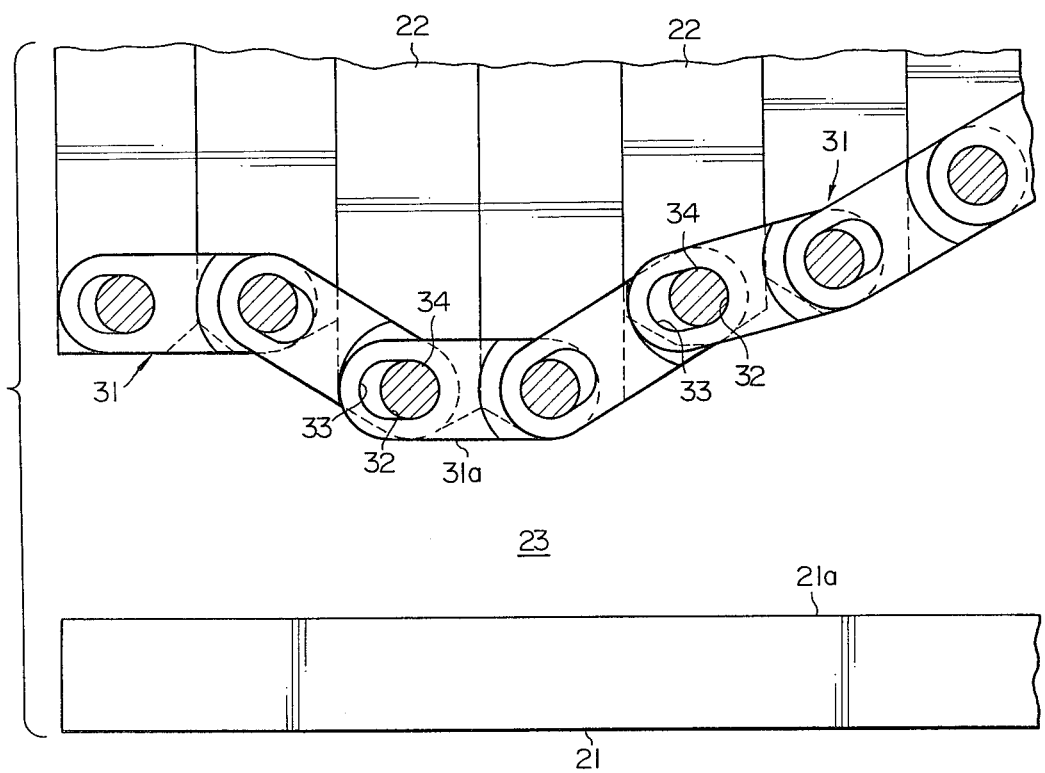
FIG. 6 is a fragmentary front view seen from the line VI—VI of FIG. 5.

Referring first to FIGS. 4 to 6 of the drawings, an adjustable extrusion die assembly 20 embodying the present invention is shown as comprising a stationary die member 21 having a flat upper end surface 21a and a plurality of movable die members 22 positioned in side-by-side relationship to one another and slidably contacted with one another. The movable die members 22 are disposed with respect to the stationary die member 21 in such a manner to respectively have lower end surfaces 22a opposing to and spaced apart from the upper end surface 21a of the stationary member 21, the upper end surface 21a of the stationary die member 21 and the lower end surface 22a of the movable die members 22 defining in combination an extrusion opening 23 through which the elastic material is to be extruded. The movable die members 22 are adapted to be individually movable toward and away from the upper end surface 21a of the stationary die member 21 with respect to one another so as to vary the distances between the upper end surface 21a of the stationary die member 21 and the lower end surfaces 22a of the movable die members 22. The adjustable extrusion die assembly 20 embodying the present invention further comprises a guide member 24 having a guide slit 25 formed therein and extending substantially in alignment with the stationary die member 21 so that the guide slit 25 allows the guide member 24 to be guided therein. Each of the movable die members 22 has a threaded screw rod 26 projecting upwardly from the upper end face of each of the movable die members 22 and having a lower longitudinal portion threaded into the upper portion of each of the movable die member 22. The threaded screw rod 26 is held in threaded engagement with a bracket member 27 attached to the upper end face of the guide member 24 by means of suitable fastening means such as bolts 28. This results in the fact that the movable die members 22 are caused to individually move downwardly toward and upwardly away from the upper end surface 21a of the stationary die member 21 with respect to one another by means of suitable drive means not shown so as to vary the distances between the upper end surface 21a of the stationary die member 21 and the lower end surfaces 22a of the movable die members 22. The guide member 24 is formed with an extrusion opening 24a having a generally rectangular cross section and disposed in such a manner that the extrusion opening 24a is open to the extrusion opening 23 and the rear end face of the guide member 24 is held in surface-to-surface contact with the front surface of an extruder head 29 forming part of an extruder provided with an extruding screw not shown. The extruding screw serves to urge the elastic material to move toward the extrusion die assembly 20 as is well known in the art. The extruder head 29 has an extrusion passageway 30 having a downstream end having a generally rectangular cross section in conformity with the opening 24a of the guide member 24 and open to the extrusion opening 24a of the guide member 24 and an upstream end having a generally circular cross section in conformity with a cylindrical passageway formed in the extruder. The passageway 30 is thus reduced to be flat in cross section toward the opening 24a of the guide member 24.

Figure 7:
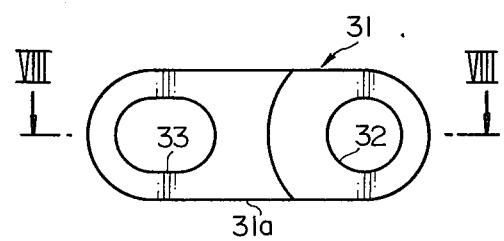
FIG. 7 is a plan view of a link member forming part of the first preferred embodiment of the adjustable extrusion die assembly according to the present invention.
Figure 8:
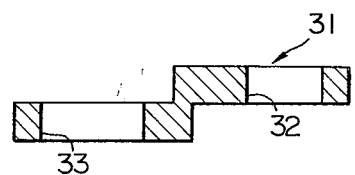
FIG. 8 is a cross sectional view taken along the line VIII—VIII of FIG. 7.

In FIGS. 7 and 8 of the drawings, the adjustable extrusion die assembly 20 embodying the present invention further comprises a plurality of link members 31 each having an intermediate portion cranked as shown. Each of the link member 31 is formed at its one end portion with a generally circular hole 32 and at its other end portion with a slot 33 extending in the longitudinal direction of the link member 31. The link members 31 are respectively pivotally connected at its opposite end portions to the lower end portions of the two adjacent movable die members 22 through the holes 32 and the slots 33 by means of bolts 34 in such a manner that one of the cranked link members 31 is superimposed on another one of the cranked link members 31 adjacent to the one of the cranked link members 31 as best shown in FIG. 5. Each of the link members 31 has a lower end surface 31a opposing to the upper end surface 21a of the stationary die member 21 and flush with the lower end surface 22a of each of the movable die members 22 under the condition that the two adjacent movable die members 22 are held in positions having the lower end surfaces 22a flush with each other. Each of the lower end portions of the movable die members 22 is chamfered at its lateral end portions in the vicinity of the contacting surfaces of the two adjacent movable die members 22.

The operation of the adjustable extrusion die assembly thus constructed will be described hereinlater.

The elastic material is extruded through the opening 23 after passing through the extrusion passageway 30 and the opening 24a of the guide member 24 into an intermediate product 1 which has a cross sectional profile conforming to that of the configuration of the opening 23 defined by the upper and lower end surfaces 21a and 22a of the stationary and movable die members 21 and 22, respectively. In this instance, the intermediate product 1 thus extruded has a continuous and smoothly curved upper configuration entirely different from that of the intermediate product 1 extruded through the prior-art extrusion die assembly 2 by the reason that the upper contour of the opening 23 of the extrusion die assembly 20 is regulated by the link members 30. It is thus to be understood that there is no corner portions 8 recessed approximately at right angles as formed in the prior-art extrusion die assembly 2. If the upper profile of the intermediate product 1 is required to be changed for another one, the screw rods 26 on the movable extrusion die members 22 are individually rotated by means of suitable drive means not shown. The movable die members 22 are thus caused to individually move toward and away from the upper end surface 21a of the stationary die member 21 with respect to one another while being guided by the guide member 24 so that the distances are varied between the upper end surface 21a of the stationary die member 21 and the lower end surfaces 22a of said movable die members 22 for a desired upper contour of the intermediate product 1.

If desired, the contour of the intermediate product 1 can be controlled by a suitable control circuit in which the movable extrusion die members 22 are individually moved in accordance with measurements of the contour of the intermediate product 1 after the intermediate product 1 is stably extruded through the extrusion die assembly 20.

An adequate or limited number of link members 31 may be used to interconnect the lower end portions of the movable extrusion die members 22 which are required to be smoothly curved at their lower end surface 22a opposing to the upper end surface 21a of the stationary die member 21 according to the present invention.

Figure 9:
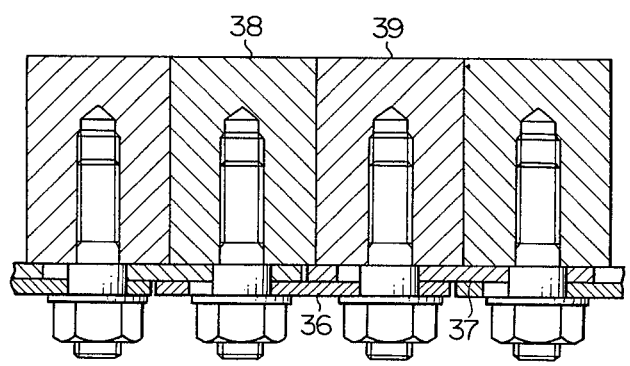
FIG. 9 is a fragmentary cross sectional view similar to FIG. 5 but showing a second preferred embodiment of the present invention.
Figure 10:
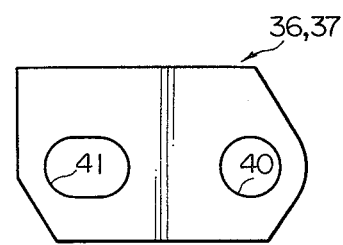
FIG. 10 is a plan view of a link member forming part of the second preferred embodiment of the adjustable extrusion die assembly according to the present invention.

While it is described in the foregoing description that each of the link members 31 is cranked at its intermediate portion, the link members may be generally in a plate-like form as shown in FIGS. 9 and 10 according to the present invention. The link members herein shown are indicated by the reference numerals 36 and 37 which are likewise superimposed on each other and are adapted to interconnect the lower end portions of the movable extrusion die members 38 and 39. Similarly, each of the link members 36 and 37 is formed at its one end portion with a generally circular hole 40 and at its other end portion with a slot 41 extending in the longitudinal direction of each of the link members 36 and 37.

What is claimed is:

1. An adjustable extrusion die assembly forming part of an extruder for an elastic material, comprising:
   a stationary die member having an end surface;
   a plurality of movable die members positoned in side-by-side relationship to one another and slidably contacted with one another, the movable die members respectively having end surfaces opposing to and spaced apart from the end surface of said stationary member, the end surfaces of said stationary and movable die members defining in combination an extrusion opening through which the elastic material is to be extruded, the movable die members being individually movable toward and away from the end surface of said stationary die member with respect to one another so as to vary the distances between the end surface of said stationary die member and the end surfaces of said movable die members;
   a guide member having formed therein a guide slit having said movable die members guided therein; and
   a plurality of link members each positioned on lower end portions of said two adjacent movable die members and each interconnecting two adjacent movable die members, said link members forming part of said extrusion opening whenever said movable die members are not flush with one another.

2. An adjustable extrusion die assembly as set forth in claim 1, in which each of said link members has an end surface opposing to the end surface of the stationary die member and flush with the end surface of each of said movable die members under the condition that said two adjacent movable die members are held in positions having the end surfaces flush with each other.

3. An adjustable extrusion die assembly as set forth in claim 1, in which each of the end portions of said movable die members opposing to the end face of said stationary die member is chamfered at its lateral end portions in the vicinity of the contacting surfaces of said two adjacent movable die members.

4. An adjustable extrusion die assembly as set forth in claim 1, in which each of said link members is cranked at its intermediate portion.

5. An adjustable extrusion die assembly as set forth in claim 1, in which each of the link member is formed at its one end portion with a generally circular hole and at its other end portion with a slot extending in the longitudinal direction of the link member.

* * * * *